United States Patent [19]

Yagi

[11] Patent Number: 5,372,412
[45] Date of Patent: Dec. 13, 1994

[54] PRESSURE TRANSMITTER FOR BRAKE CONTROL SYSTEM

[75] Inventor: Eiji Yagi, Ayase, Japan

[73] Assignee: Nissan Motor Co., Ltd., Yokohama, Japan

[21] Appl. No.: 983,428

[22] Filed: Dec. 2, 1992

[30] Foreign Application Priority Data

Dec. 6, 1991 [JP] Japan .................. 3-323311

[51] Int. Cl.$^5$ .............................. B60T 15/36
[52] U.S. Cl. .................. 303/115.2; 303/92; 303/117.1; 303/DIG. 2; 303/DIG. 4
[58] Field of Search ............ 303/117.1, 115.2, 115.4, 303/119.2, 113.1, 92, DIG. 3, DIG. 4

[56] References Cited

U.S. PATENT DOCUMENTS

| | | | |
|---|---|---|---|
| 3,286,734 | 11/1966 | Hartshorne | 303/117.1 |
| 3,936,095 | 2/1976 | Every | 303/92 |
| 4,940,295 | 7/1990 | Adachi et al. | 303/117.1 |
| 5,106,170 | 4/1992 | Matsuda et al. | 303/92 |
| 5,114,216 | 5/1992 | Tsuda et al. | 303/117.1 |
| 5,150,951 | 9/1992 | Leiber et al. | 303/117.1 |
| 5,172,963 | 12/1992 | Brown | 303/119.2 |
| 5,221,126 | 6/1993 | Inoue | 303/117.1 |

FOREIGN PATENT DOCUMENTS

| | | |
|---|---|---|
| 62-149543 | 7/1987 | Japan . |
| 64-83444 | 3/1989 | Japan . |
| 2224088 | 4/1990 | United Kingdom ............. 303/115.4 |

Primary Examiner—Matthew C. Graham
Attorney, Agent, or Firm—Foley & Lardner

[57] ABSTRACT

A pressure transmitter for a brake control system is provided with a piston having a passage extending between an input pressure chamber and an output pressure chamber and a seal fixedly installed on one end of the piston for sealing closing an end of the passage. The seal is resiliently deformable for transmission of pressure between the input pressure chamber and the output pressure chamber. A pressure control valve for a brake control system includes a valve spool for controlling communication between a pressure source and a wheel cylinder for producing a control pressure which is boosted on the basis of a master cylinder pressure and a vehicle running condition, a set of plungers for urging the valve spool in the direction of increasing the control pressure in response to increase of the master cylinder pressure and a solenoid for urging in the valve spool in the direction of causing decrease of the control pressure in response to increase of current supplied to the solenoid.

9 Claims, 6 Drawing Sheets

PRESSURE TRANSMITTER FOR BRAKE CONTROL SYSTEM

BACKGROUND OF THE INVENTION

1. Field of the Invention

The present invention relates to a pressure transmitter for use in a brake control system. The present invention further relates to a brake control system of the kind which is capable of controlling a braking force irrespective of a braking operation.

2. Disclosure Information

A brake control system of the aforementioned kind is disclosed in Japanese Patent Provisional Publication No. 62-149543. In such a brake control system, a pressure regulator and a pressure modulator are disposed between a master cylinder and each wheel cylinders. The pressure regulator is adapted to receive a master cylinder pressure and an additional pressure from a pressure source for producing a regulated pressure which is desired times larger than the master cylinder pressure. The pressure modulator outputs a braking pressure which is equal to the sum of the output pressure of the pressure regulator and the master cylinder pressure.

Such a prior art brake control system is disadvantageous since it is poor in responsiveness in a low braking pressure and high braking pressure variation frequency range. That is, the pressure modulator includes a piston slidable in a cylinder while defining an input pressure chamber and an output pressure chamber therewithin and sealing members installed on the piston to provide a seal between the piston and the cylinder. Due to this, in the event where a braking pressure which is low but high in variation frequency is supplied to the input pressure chamber of the pressure modulator, the piston remains immovable due to the friction between the cylinder and the sealing members, that is, the piston does not move until it is driven by a force prevailing against the friction between the cylinder and the sealing members. A hysteresis is thus caused between the output pressure increasing characteristic and the output pressure decreasing characteristic of the pressure modulator, thus deteriorating the responsiveness of the brake control system in a low braking pressure and high braking pressure variation frequency range, i.e., when the braking pressure is in a low range and its variation frequency is in a high range.

SUMMARY OF THE INVENTION

In accordance with an aspect of the present invention, there is provided a pressure transmitter which comprises a cylinder, a piston slidable in the cylinder and defining on opposite axial ends thereof an input pressure chamber and an output pressure chamber, first sealing means for sealing between the cylinder and the piston, and second sealing means for sealing between the input pressure chamber and the output pressure chamber and resiliently deformable in response to pressure differential between the input pressure chamber and the output pressure chamber for transmission of pressure therebetween.

In accordance with another aspect of the present invention, there is provided a pressure transmitter which comprises a cylinder, a piston slidable in the cylinder and defining on opposite axial ends thereof an input pressure chamber and an output pressure chamber, first sealing means for sealing between the cylinder and the piston, the piston having an axial passage for providing communication between the input pressure chamber and the output pressure chamber, and second sealing means for sealingly closing the axial passage and resiliently deforamble in response to pressure differential between the input pressure chamber and the output pressure chamber for transmission of pressure therebetween.

In accordance with a further aspect of the present invention, there is provided a brake control system for a vehicle, which comprises a master cylinder for producing a master cylinder pressure in response to a manual braking operation, a pressure source, pressure control valve means communicable with the pressure source for producing a control pressure which is boosted on the basis of the master cylinder pressure and a vehicle running condition, a wheel cylinder, and a pressure transmitter communicated with the wheel cylinder and selectively communicable with one of the control valve means and the master cylinder for transmitting one of the control pressure and the master cylinder pressure to the wheel cylinder. The pressure transmitter has a cylinder, a piston slidable in the cylinder and defining on opposite axial ends thereof an input pressure chamber and an output pressure chamber, first sealing means for sealing between the cylinder and the piston, and second sealing means for sealing between the input pressure chamber and the output pressure chamber and resiliently deformable in response to pressure differential between the input pressure chamber and the output pressure chamber for transmission of pressure therebetween. The input pressure chamber is in constant communication with the pressure control valve and the output pressure chamber is in constant communication with the wheel cylinder and in selective communication with the master cylinder.

In accordance with another aspect of the present invention, there is provided a brake control system for a vehicle, which comprises a master cylinder for producing a master cylinder pressure in response to a manual braking operation, a pressure source, pressure control valve means communicable with the pressure source for producing a control pressure which is boosted on the basis of the master cylinder pressure and a vehicle running condition, a wheel cylinder, a pressure transmitter communicated with the wheel cylinder and selectively communicable with one of the control valve means and the master cylinder for transmitting one of the control pressure and the master cylinder pressure to the wheel cylinder, and directional control valve means for obstructing communication between the master cylinder and the pressure transmitter when the pressure control valve means produces the control pressure and for providing communication between same when the pressure control valve means stops producing the control pressure. The pressure transmitter has a cylinder, a piston slidable in the cylinder and defining on opposite axial ends thereof an input pressure chamber and an output pressure chamber, first sealing means for sealing between the cylinder and the piston, and second sealing means for sealing between the input pressure chamber and the output pressure chamber and resiliently deformable in response to pressure differential between the input pressure chamber and the output pressure chamber for transmission of pressure therebetween. The input pressure chamber is communicated with the pressure control valve, and the output pressure chamber is communicated directly with the wheel cylinder and by way of the directional control valve means with the master cylinder.

In accordance with a further aspect of the present invention, there is provided a brake control system for a vehicle, which comprises a master cylinder for producing a master cylinder pressure in response to a manual braking operation, a pressure source, pressure control valve means communicable with the pressure source for producing a control pressure which is boosted on the basis of the master cylinder pressure and a vehicle running condition, a wheel cylinder, first passage means for supplying the master cylinder pressure from the master cylinder to the wheel cylinder, second passage means for supplying the control pressure from the pressure control valve means to the wheel cylinder, and first directional control valve means installed in the first passage means for controlling supply of the master cylinder pressure to the wheel cylinder.

The above structure is effective for solving the above noted problems inherent in the prior art device.

It is accordingly an object of the present invention to provide a novel and improved pressure transmitter for a brake control system which has a good responsiveness in operation, particularly in transmission of pressure in a low pressure and high pressure variation frequency range.

It is a further object of the present invention to provide a novel and improved pressure transmitter of the above described character which can effect a good responsiveness throughout a low to high pressure and pressure variation frequency range.

It is a further object of the present invention to provide a novel and improved pressure transmitter of the above described character which will not cause any substantial hysteresis between the output pressure increasing characteristic and the output pressure decreasing characteristic.

It is a further object of the present invention to provide a novel and improved brake control system which can attain a wider braking pressure control range with or without relation to a master cylinder pressure.

It is a further object of the present invention to provide a novel and improved brake control system of the above described character which can effect not only a normal braking control but an antilocking control and a traction control without requiring a number of pressure control valves but one.

It is a further object of the present invention to provide a novel and improved brake control system of the above described character which can assuredly retain the effectiveness of the brake in the event of failure of a control pressure line.

DETAILED DESCRIPTION OF THE PREFERRED EMBODIMENTS

Referring first to FIGS. 1 through 4, a brake control system according an embodiment of the present invention includes a master cylinder 2 for generating a master cylinder pressure PM in accordance with a manual braking effort or braking operation on a brake pedal 1, a wheel cylinder 4 provided to a disc brake 3 of each vehicle wheel (not shown), a solenoid operated pressure control valve 5 having a master cylinder pressure chamber 50 which is supplied with the master cylinder pressure PM through a master cylinder port 5e, and adapted for allowing the master cylinder pressure PM to urge a valve spool 51 in the direction of increasing an output pressure of the control valve 5 whilst allowing a force generated by a proportional solenoid 52 to urge the spool 51 in the direction of decreasing an output pressure of the control valve 5, a hydraulic pressure source 7 connected to the pressure control valve 5 by way of an accumulator pressure passage 6 and constituted by an oil pump 7a, check valve 7b and an accumulator 7c, a solenoid operated directional control valve 8 for making, when in an opened position, a traction control pressure PT which is prepared by using the accumulator pressure PS as a base pressure, act on the spool 51 for urging the same in the direction of increasing the output pressure of the control valve 5 by way of the traction control port 5b of the pressure control valve 5, a pressure transmitter 12 for the control pressure PC or the master cylinder pressure PM as an input pressure PIN and transmitting to the wheel cylinder 4 an output pressure serving as a wheel cylinder pressure PW by way of a piston 121, and a pilot operated directional control valve 18 disposed in a master cylinder pressure passage 10 and using the control pressure PC as a pilot pressure so as to effect such a flow direction changing action for making, when the control pressure PC is produced by the control valve 5, the input pressure PIN of the pressure transmitter 12 be constituted by the control pressure PC and, when the control pressure PC is not produced by the control valve 5, the input pressure PIN of the pressure transmitter 12 be constituted by the master cylinder pressure PM.

The solenoid operated pressure control valve 5 includes, between the master cylinder pressure chamber 50 and the valve spool 51, a first plunger 53, a second plunger 54, a seat member 55, a resilient member 64 and a third plunger 56. The control valve 5 further includes a first spring. 57 between a valve case 60 and the first plunger 53, a second spring 58 between the valve case 60 and the second plunger 54, a fourth spring 62 between the first plunger 53 and the second plunger 54, and a fifth spring 63 between the second plunger 54 and the seat member 55. The first spring 57 is set so as to exert a larger biasing force than the second spring 58. A sixth spring 59 is disposed on the proportional solenoid 52 side of the valve spool 51 for urging the valve spool 51 in the right-hand direction in FIG. 1. The control valve 5 further has an output port 5c and a drain port 5d.

Figure 2:
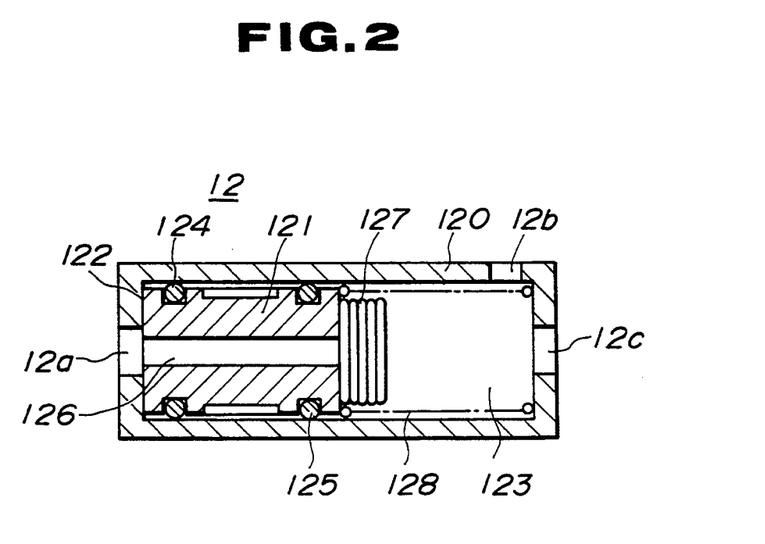
FIG. 2 is an enlarged cross-sectional view of a pressure transmitter of FIG. 1.

The pressure transmitter 12, as shown in an enlarged scale in FIG. 2, is provided with a piston 121 slidable in a cylinder 120 for defining at the opposite axial ends thereof an input pressure chamber 122 and an output pressure chamber 123. The piston 121 is provided with sealing members 124, 125 at its sliding portion whilst being fixed with, at its end face on the output pressure chamber 123 side, a metallic bellows 127 which faces at one end face the input pressure chamber 122 by way of a communication passage 126 formed in the piston 121 and at the other end face an output pressure chamber 123. The piston 121 is biased by a return spring 128 in the left-hand direction in the drawings. The cylinder 120 is provided with a control pressure port 12a in communication with the input pressure chamber 122 and further provided with a master cylinder pressure port 12b and a wheel cylinder pressure port 12c in communication with the output pressure chamber 123.

Figure 1:
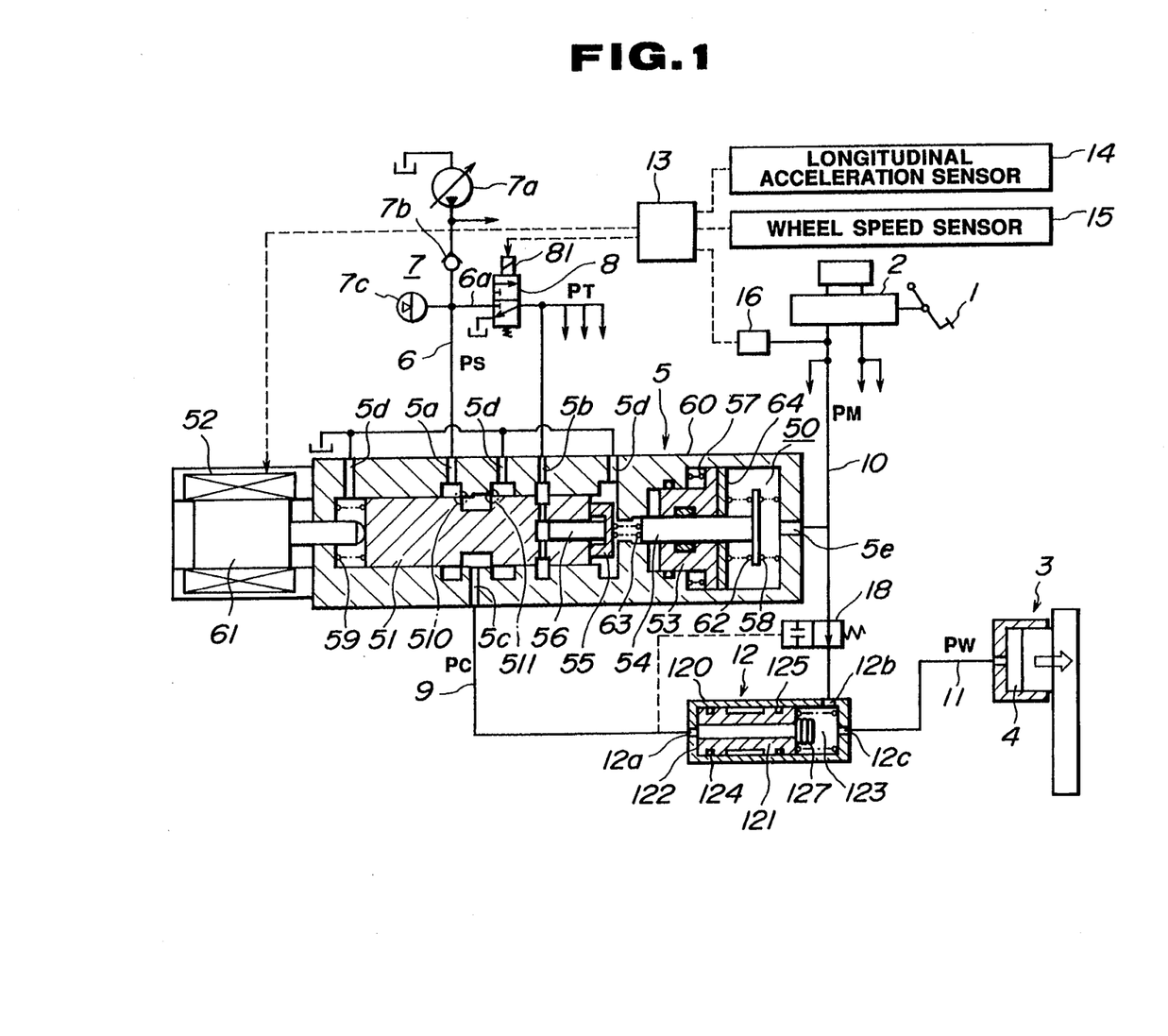
FIG. 1 is a simplified diagram of a brake control system according to an embodiment of the present invention, with a cross-sectional view of a solenoid controlled pressure control valve and a pressure transmitter.

The proportional solenoid 52 and the solenoid 81 of the control valve 5 are controlled on the basis of commands supplied thereto from the brake controller 13. The brake controller 13 is connected with a vehicle longitudinal acceleration sensor 14, a vehicle wheel speed sensor 15, a master cylinder pressure sensor 16, etc. so as to obtain necessary informations therefrom.

The operation will be described hereinbelow.

(a) During normal braking Firstly, when there is no braking effort on the brake pedal 1, i.e., when the brake pedal 1 is not depressed, the solenoid operated pressure control valve 5 is put into such an operating condition in which the second plunger 54 is urged by the first plunger 53 and by way of the fourth spring 62 inn the right-hand direction in FIG. 1 since the first spring 57 is set so as to exert a larger biasing force than the second spring 58. When the brake pedal 1 is depressed, a master cylinder pressure PM proportional to a brake pedal depressing force is generated in the master cylinder 2 and supplied to the master cylinder pressure port 5e of the control valve 5 such that when the master cylinder pressure PM increases up to PM1 (refer to FIG. 4) its resulting force acting on the first plunger 53 prevails against the biasing force of the first spring 57 and causes the first plunger 53 to move in the left-hand direction in FIG. 1. Accordingly, the force urging the second plunger 54 in the right-hand direction is eliminated, thus causing the second plunger 54 to move in the left-hand direction under the bias of the master cylinder pressure PM and the second spring 58 for thereby urging the seat member 55 and therefore the spool 51 in the left-hand direction in FIG. 1. In this instance, the force urging the spool 51 in the left-hand direction is expressed by $F2+A4 \cdot PM$ where F2 is the spring force of the second spring 58 and A4 is the pressure receiving area of the second plunger 54.

When the spool 5I is acted upon by the force (F2+A4 PM), it is caused to move in the left-hand direction in FIG. 1 to open the port 510, thus allowing the accumulator pressure PS to be supplied through the input port 5a to the output port 5c. The valve spool 51 has a stepped outer circumferential shape so that it is urged in the right-hand direction by the control pressure PC prevailing at the output port 5c and thus caused to move in the right-hand direction. The driving force resulting from the control pressure PC in this instance is expressed by $(A1-A2) \cdot PC$ where A1 is the cross-sectional area of the larger diameter portion of the spool 51 and A2 is the cross-sectional area of the smaller diameter portion of the spool 51.

The balance of forces acting on the valve spool 51 in this instance is expressed by $(A1-A2) PC = A4 \cdot PM + F2 - F1$ where F1 is the force of the fifth spring 59.

Accordingly, the control pressure PC is proportional to the master cylinder pressure PM and amounts to be the value resulting from the sum of the master cylinder pressure PM and the spring force (F2−F1).

Then, when current flows through the proportional solenoid 52, a force FS proportional to the current i is generated to drive the solenoid plunger 61 and pushes the valve spool 51 in the right-hand direction in FIG. 1. The balance of forces acting on the spool 51 in this instance is expressed by $(A1-A2) \cdot PC = A4 \cdot PM + F2 - F1 - FS$.

Accordingly, the control pressure PC is increased and decreased in accordance with the current i supplied to the proportional solenoid 52. In the event where the control pressure PC is generated in the above manner in accordance with braking effort, the pilot operated directional control valve 18 using the control pressure PC as a pilot pressure is operated to obstruct communication between the master cylinder pressure passage 10 and the wheel cylinder pressure passage 11, thus allowing the control pressure PC, which is supplied to the pressure transmitter 12 to urge the piston 121 in the right-hand direction in FIG. 1, to serve as the wheel cylinder pressure PW.

By the foregoing operation, the wheel cylinder pressure PW is controlled in accordance with the following expression.

$$PW = (A4 \cdot PM + F2 - F1 - FS) / (A1 - A2)$$

Figure 4:
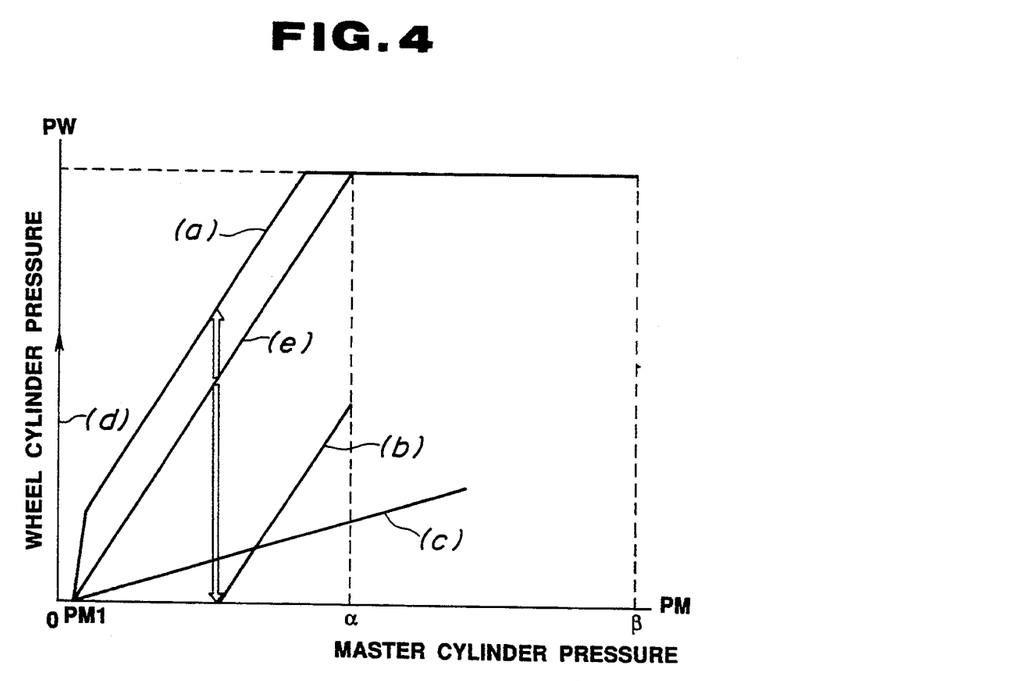
FIG. 4 is a graph diagramatically representing a brake pressure characteristic of the brake control system of FIG. 1.

This is represented by the characteristics shown in FIG. 4. That is, when the solenoid current i is zero the pressure increasing rate becomes largest as represented by the line (a), and as the solenoid current i increases the wheel cylinder pressure PW decreases in proportion to increase of the current i as represented by the lines (e)∼(b). In the meantime, the line (c) in FIG. 4 represents the characteristic which is obtained when the master cylinder pressure PM is used as the wheel cylinder pressure PW without making any changes thereto, that is, when PM=PW.

Then, by setting, in accordance with a vehicle condition, a wheel cylinder pressure characteristic in the brake controller 13 by using a function, map or the like and controlling the solenoid current i on the basis of the information representing the vehicle condition and the information from the master cylinder pressure sensor 16, it becomes possible to select a desired pressure boost characteristic and thereby obtain a desired wheel cylinder pressure in accordance with a vehicle condition. In this manner, it becomes possible to attain a braking pressure boost control not for a fixed boost ratio but for various boost ratios which increase the freedom in brake control.

(b) During braking under antilocking control

In the event where the vehicle wheel is liable to lock at the time of rapid braking or braking on a low-μ road surface (i.e., a road surface having a low frictional resistance such as an icy road surface), a control command is supplied from the antilocking control section of the brake controller 13 to the proportional solenoid 52 for performing an antilocking operation, i.e., for preventing wheel lock. That is, by setting the solenoid current i so that the characteristic (e) between the characteristics (a) and (b) is used as a normal boosting characteristic, it becomes possible to attain both pressure increase up to the characteristic (a) and pressure decrease down to the characteristic (b). By this, the wheel cylinder pressure PW can be increased and decreased through control of the solenoid current i so that the slip rate, which is obtained on the basis of the vehicle running condition which is obtained through integration of an input information from a vehicle longitudinal acceleration sensor 14 and on a wheel speed information from a wheel speed sensor 15, is controlled so as to be included within an optimal slip rate range. In the meantime, in the event of this antilock braking operation, the pilot operated directional control valve 18 is operated so as to shut off the master cylinder pressure passage 10.

In this manner, it becomes possible to obtain an antilocking function which improves the vehicle stability during braking by the effect of a wide range for increase and decrease of the wheel cylinder pressure PW.

(c) During braking under traction control

In the event where a driving wheel slip is caused by a rapid accelerator pedal depressing operation at the time of rapid starting, rapid acceleration, etc, the traction control section of the brake controller 13 supplies a control command to the proportional solenoid 52 and an ON command to the solenoid 81 of the directional control valve 8 for thereby performing a traction control, i.e., an operation for suppressing the driving wheel slip.

That is, when an ON command is supplied to the solenoid 81, the control valve 8 is operated to open and causes the accumulator pressure PS to be supplied to the traction control port 5b of the pressure control valve 5 as a traction control pressure PT.

When this traction control pressure PT acts on the third plunger 56, the valve spool 51 is caused to move in the left-hand direction in FIG. 1. The balance of forces acting on the valve spool 51 in this instance is represented by $$(A1-A2)\cdot PC = A3\cdot PT - F1 - FS$$

where A3 is a pressure receiving area of the third plunger 56.

Accordingly, though there is not generated any master cylinder pressure PM, the control pressure PC can be controlled optionally, in accordance with the solenoid current i, between a maximum pressure which is determined on the basis of the traction control pressure PT and a decreased pressure which is decreased from the maximum pressure by the amount corresponding to the force FS which is proportional to the solenoid current i. This is represented by the characteristic (d) in FIG. 4. In this manner, it becomes possible to apply a braking force to the driving wheel in accordance with driving wheel slip, thus making it possible to obtain a traction control for effectively suppressing the driving wheel slip.

(d) In the event of failure

In the event of failure of an electronic control system relating to the brake controller 13, current i to be supplied to the proportional solenoid 52 is reduced to zero for thereby causing the directional control valve 8 to close to obstruct communication between the accumulator pressure passage 6 and the traction control port 5b.

Accordingly, the forces acting on the spool 51 have the following relation.

$$(A1-A2)\cdot PC = A4\cdot PM + F2 - F1$$

Thus, though it is not possible to obtain an antilocking operation and a traction controlling operation, the characteristic (a) in FIG. 4 is maintained, that is, the maximum braking pressure boost ability is retained. By this, it becomes possible to assuredly obtain a braking operation having a braking pressure boost action.

In the event of failure of hydraulic pressure source, i.e., in the event where due to the malfunction of the hydraulic pump 7a, etc. the pressure source 7 cannot supply the accumulator pressure to the accumulator pressure line 6, the control pressure PC is not output from the control valve 5. When this is the case, the master cylinder pressure PM is used as the wheel cylinder pressure PW without any change thereto and supplied to the wheel cylinder 4 of each vehicle wheels.

Accordingly, even in failure of the hydraulic pressure source 7, the braking function is assuredly retained as represented by the characteristic (c) in FIG. 4 though a boosting ability is lost.

(e) Brake pedal feel

When the brake pedal 1 is depressed, the amount of hydraulic fluid discharged from the master cylinder 2 is determined depending upon the amount of initial movements of the valve spool 51 and the wheel cylinder 4 (i.e., their movements until the pilot operated directional control valve 18 closes) and the amount of deformation of the resilient member 64. Of these, since the initial movements of the valve spool 51 and the wheel cylinder 4 are small, the quantity of hydraulic fluid discharged from the master cylinder 2 is determined depending upon the deformation characteristic of the resilient member 64. That is, without the resilient member 64, there is obtained little pedal stroke. In contrast to this, with the resilient member 64, a pedal stroke becomes such a pattern that is determined depending upon the pressure-deformation characteristic of the resilient member 64. The relation of 2 pedal stroke relative to master cylinder pressure after depression of the pedal is represented by a linearly changing characteristic since the spring 57 having a constant rate of spring is used as a damper.

(f) Responsiveness

Figure 3:
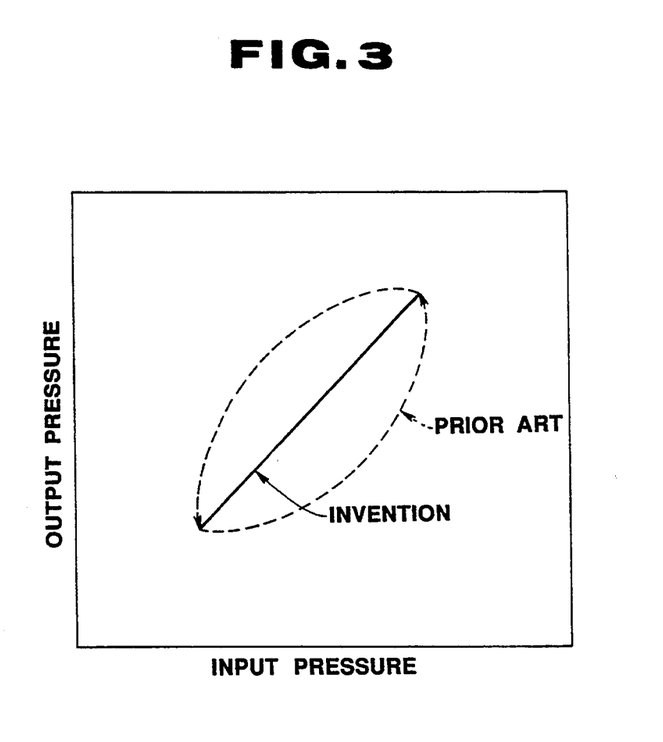
FIG. 3 is a graph diagramatically representing an input-output pressure characteristic of the pressure transmitter of FIG. 1.

When a control pressure PC which is low but of a high pressure variation frequency is supplied to the input pressure chamber 122 of the pressure transmitter 12, the piston 121 does not move due to the resistance between the seals 124, 125 and the cylinder 120 but instead the metallic bellows 127 fixed to the plunger piston 121 is caused to axially expand or contract for thereby transmitting pressure to the output chamber 123. In this instance, since the transfer of pressure is performed by the effect of axial expansion or contraction of the bellows 127, there is caused little hysteresis between pressure increase and pressure decrease, thus making it possible to improve the responsiveness in a low pressure and high pressure variation frequency range. With a comparable prior art device such a characteristic having a hysteresis as represented by the dotted lines in FIGS. 3 is obtained. In contrast to this, with this embodiment such a characteristic having little hysteresis as represented by the solid line in FIG. 3 is obtained.

Further, in the range where a pressure variation is large as in the case of step response, etc., the piston 121 is caused to slide to perform transfer of pressure, whilst in the range where a pressure variation is small transfer of pressure is performed by the deformation of the resilient stationary seal, that is, two functions are provided separately, thus making it possible to obtain a high responsiveness in brake control throughout a low to high braking pressure and braking pressure variation frequency range.

From the foregoing, it will be understood that since a pressure transmitter is provided with a metallic bellows, it can attain an improved responsiveness in output or build-up of a wheel cylinder pressure even when an input control pressure is low and its variation frequency is high.

It will be further understood that by the provision of a pressure transmitter it becomes possible to obtain, in the event of failure of a control pressure line, a brake control with a high responsiveness throughout a low to high pressure and pressure variation frequency range whilst retaining the effectiveness of the brakes, i.e, holding the brakes effective in operation.

It will be further understood that a brake control system of this invention is operable to attain various functions such as a pressure boosting function, atilocking function and traction controlling function.

Figure 5:
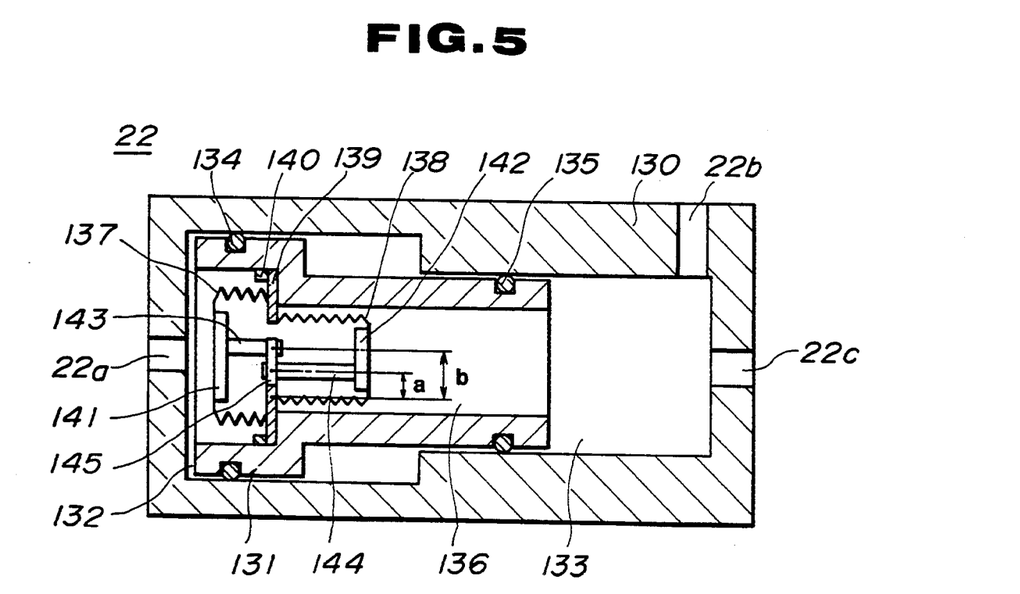
FIG. 5 is a cross-sectional view of a pressure transmitter according to a modification of the present invention.

FIG. 5 shows a pressure transmitter 22 according to a modification of the present invention. The pressure transmitter 22 includes a stepped piston 131 slidable in a cylinder 130 to define on the opposite axial ends thereof an input pressure chamber 132 and an output pressure chamber 133. The stepped piston 131 is provided with seals 134, 135 at its sliding portion and further provided with a larger diameter bellows 137 and a smaller diameter bellows 138. The larger diameter bellows 137 and smaller i diameter bellows 138 face at the remoter ends thereof an input pressure chamber 132 and an output pressure chamber 133 by way of a stepped communication passage 136, respectively. The larger diameter bellows 137 and smaller diameter bellows 138 are fixed at the nearer ends thereof to a doughnut-shaped end plate 139 and fixedly installed in the stepped communication passage 136 by means of a retainer 140. The both bellows 137, 138 have at the remoter ends thereof disc-like plates 141, 142 which are installed in such a manner as to allow deformation of the bellows 137, 138. Fixedly connected to the respective plates 141, 142 are links 143, 144 which are in turn rotatably connected to a link 145. The link 145 is disposed within the bellows 137, 138 at a location adjacent to a longitudinally central place thereof and rotatably connected at its lower end to the end plate 139. The cylinder 130 is provided with a control pressure port 22a in communication with the input pressure chamber 132 and further with a master cylinder pressure port 22b and a wheel cylinder pressure port 22c in communication with the output pressure chamber 133. In the meantime, while the inside of the both metallic bellows 137, 138 are filled with air, deformation of the bellows actually caused in use is so small as to allow the resulting expansion and contraction of the air to be included within its allowable range.

Assuming that the effective pressure receiving areas of the both metallic bellows 137, 138 are respectively indicated by "A", "B", and the distance between the points where the link 145 is respectively connected with the end plate 139 and the link 144 and the distance between the points where the link 145 is respectively connected with the end plate 139 and the link 143 with the link 145 are respectively indicated by "a", "b", the following expression is obtained since the force applied to the larger diameter bellows 137 is transmitted to the smaller diameter bellows 138 by way of the links 143, 144 and 145.

$$a \cdot b \cdot PW = b \cdot A \cdot PC$$

Accordingly, assuming that the larger diameter and the smaller diameter of the piston 131 are respectively indicated by A5, A6, the following expression is obtained.

$$A5 / A6 = A / a \cdot B$$

With this pressure transmitter 22, it becomes possible to make the boost rate resulting from the ratio of the larger diameter to the smaller diameter of the stepped piston 131 coincide with the boost rate obtained by the operation of the bellows 137, 138 for thereby attaining a smooth pressure transfer action by the effect of movement of the piston 131 and deformation of the bellows 137 and 138.

Figure 6:
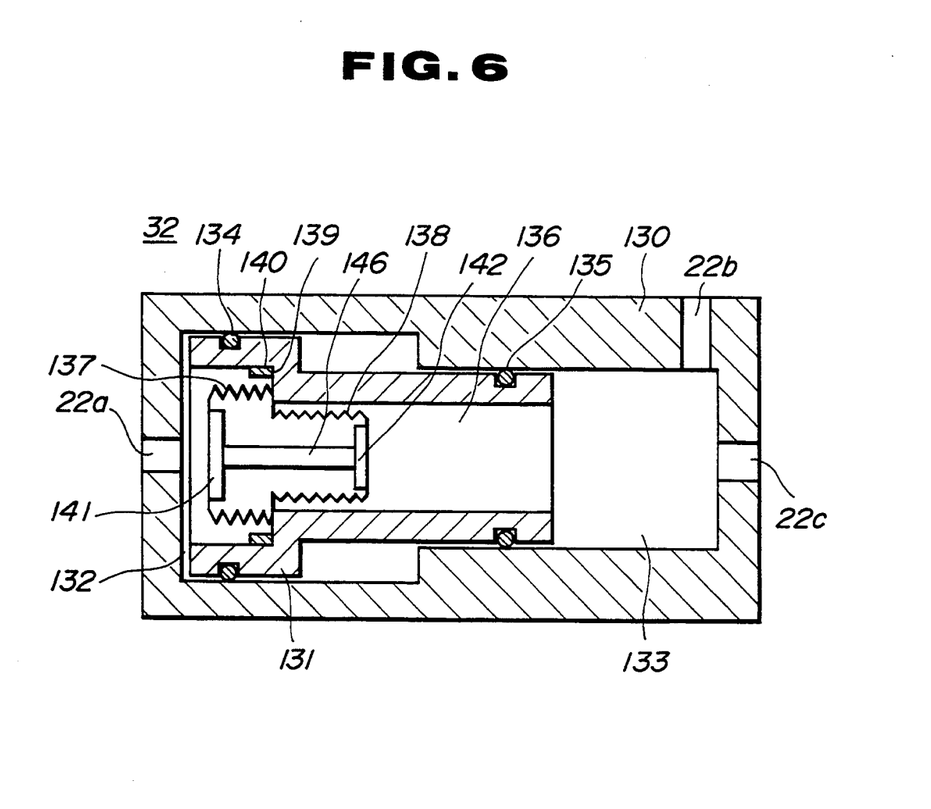
FIG. 6 is a view similar to FIG. 5 but shows a pressure transmitter according to a further embodiment.

FIG. 6 shows a pressure transmitter 32 according to a modification of the present invention. In this pressure transmitter 32, the both plates 141, 142 are connected by a single link 146. By setting the ratio of links so as to satisfy a=b, A5 / A6=A / B is obtained. With this pressure transmitter 32, the structure can be simplified.

Figure 7:
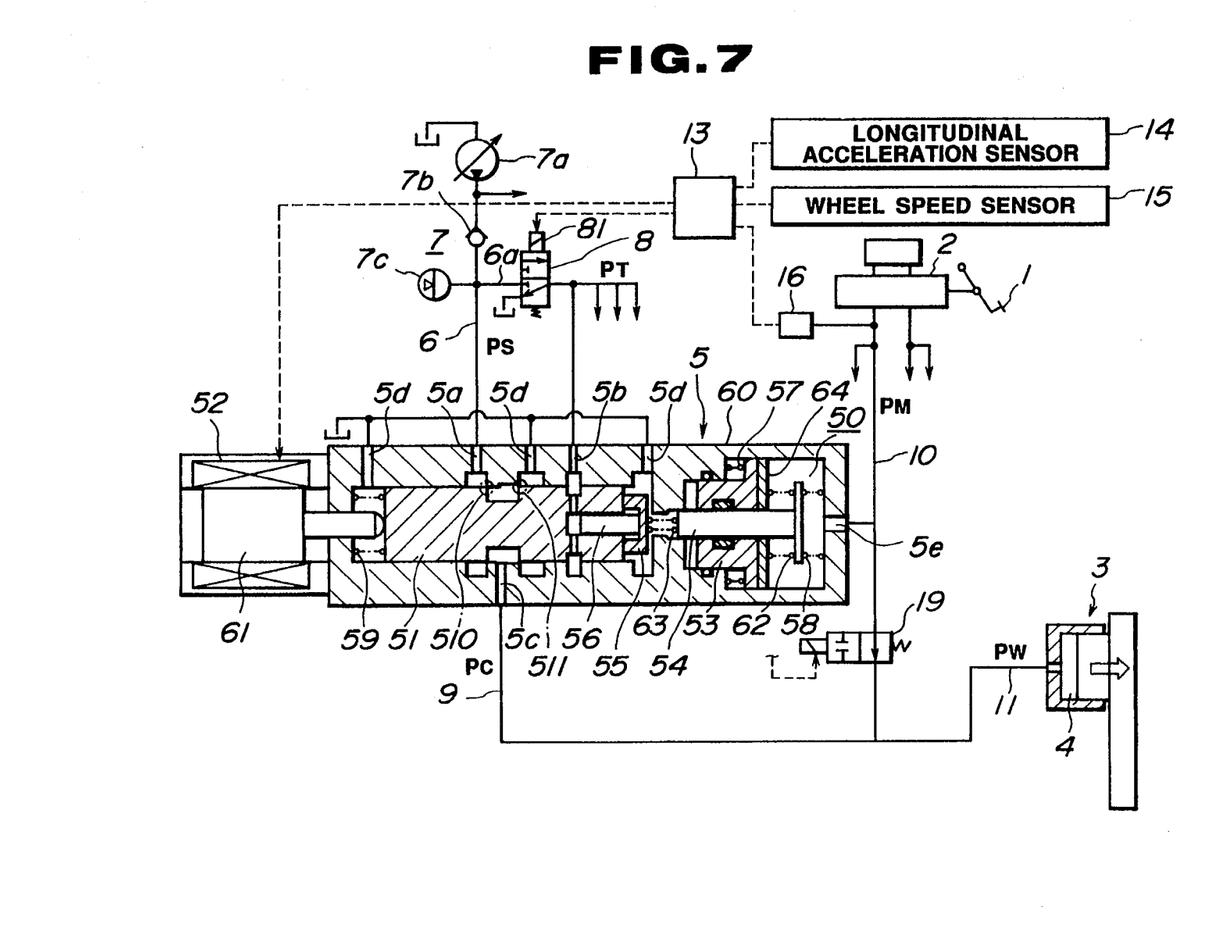
FIG. 7 is a view similar to FIG. 1 but shows a brake control system according to a further embodiment.

FIG. 7 shows a brake control system according to a further embodiment. This brake control system differs from the previous embodiment of FIG. 1 in that the pressure transmitter 12 is eliminated and that the control pressure passage 9 leading from the solenoid operated pressure control valve 6 and the master cylinder pressure passage 10 leading from the master cylinder 2 are both connected to the wheel cylinder pressure passage 11 of the wheel cylinder 4, and that of those passages the master cylinder pressure passage 10 is provided at its intermediate portion with a solenoid operated directional control valve 19 which is actuated to open and close by means of the brake controller 13.

while the operation of this embodiment is substantially similar to that of the embodiment of FIG. 1, this embodiment can attain a high responsiveness throughout the low to high pressure and pressure variation frequency range since the control pressure PC and the master cylinder pressure PM are supplied directly to the wheel cylinder 4.

This embodiment can produce substantially the same effect with the previous embodiment of FIG. 1.

Figure 8:
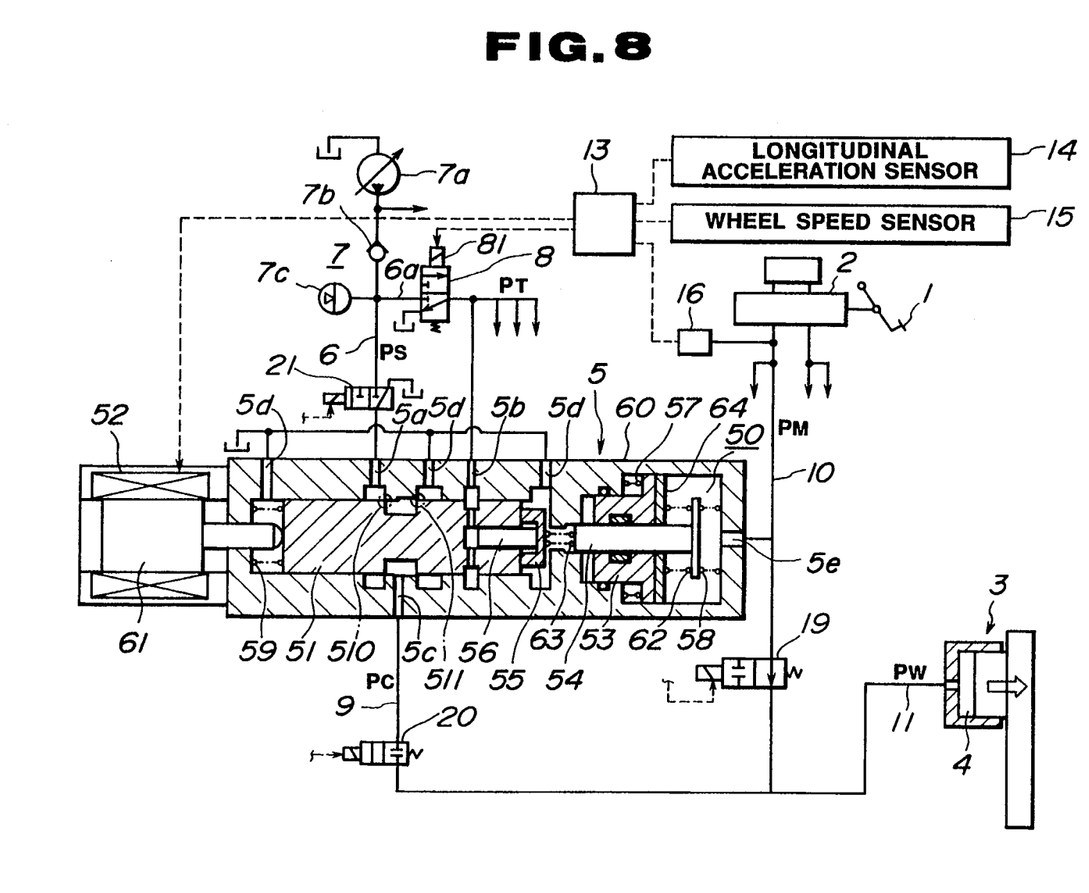
FIG. 8 is a view similar to FIG. 1 but shows a brake control system according to a further embodiment.

FIG. 8 shows a brake control system according to a further embodiment. This embodiment differs from the previous embodiment of FIG. 7 in that the control pressure passage 9 is provided with a solenoid operated directional control valve 20 which is adapted to close at the time of failure of the control pressure line. In the meantime, 21 is a failsafe directional control valve provided to the accumulator pressure passage 6.

In operation, in the event of, for example, failure of the control pressure line in which a signal from a accumulator pressure sensor (not shown) is lower than a predetermined value, the solenoid operated directional control vale 20 is closed to separate the master cylinder pressure line from the control pressure line for thereby holding the master cylinder pressure line and therefore the brake effective in operation.

This embodiment thus can retain the effectiveness of the brakes even in failures of the control pressure line. Except for the above, this embodiment can produce substantially the same effect with the previous embodiment of FIG. 1.

While the pressure transmitter has been described and shown as above, it is not for the purpose of limitation. For example, it may be used for control of the vehicle turning characteristic through feedback control of yaw rate, lateral acceleration, etc.

What is claimed is:

1. A brake control system for a vehicle comprising:
    a master cylinder for producing a master cylinder pressure in response to a manual braking operation;
    a pressure source;
    controller means for detecting a magnitude of the master cylinder pressure and a vehicle running condition and producing an electrical control signal representative thereof;
    pressure control valve means fluidly connected to said pressure source and responsive to the control signal for producing a control pressure variable with variation of the master cylinder pressure and the vehicle running condition;
    a wheel cylinder;
    first passage means for supplying the master cylinder pressure from said master cylinder to said wheel cylinder;
    second passage means for supplying the control pressure from said pressure control valve to said wheel cylinder; and
    first directional control valve means operatively connected to said first passage means for normally preventing supply of the master cylinder pressure to said wheel cylinder and permitting said supply of the master cylinder pressure at the time of failure of said controller means and said pressure control valve means.

2. A brake control system according to claim 1, further comprising second directional control valve means operative by connected to said second passage means for normally permitting supply of the control pressure to said wheel cylinder and preventing said supply of the control pressure at the time of failure of said controller means and said pressure control valve means.

3. A brake control system according to claim 1, wherein said pressure control valve means comprises a valve spool for controlling communication between said pressure source and said wheel cylinder and plunger means for urging said valve spool in the direction of causing increase of the control pressure.

4. A brake control system according to claim 3, wherein said pressure control valve means further comprises solenoid means for urging said valve spool in the direction of causing decrease of said control pressure.

5. A brake control system according to claim 4, wherein the signal from said control means is supplied to said solenoid for controlling energization of said solenoid for thereby controlling decrease of said control pressure through control of current supplied to said solenoid.

6. A brake control system according to claim 5, wherein said pressure control valve means comprises third passage means for supplying a pressure of said pressure source to said valve spool for thereby urging said valve spool in the direction of causing increase of said control pressure, and third directional control valve means operatively connected to said third passage means for controlling communication between said pressure source and said pressure control valve means, said controller means producing an electrical control signal representative of only the vehicle running condition and supplying it to said third directional control valve means for thereby controlling operation of said third directional control valve means with relation to the vehicle running condition but without relation to the master cylinder pressure.

7. A brake control system for a vehicle comprising:
    a master cylinder for producing a master cylinder pressure in response to a manual braking operation;
    a pressure source;
    an electrical controller for detecting a magnitude of the master cylinder pressure and a vehicle running condition and producing a first electrical control signal representative of both the master cylinder pressure and the vehicle running condition and a second electrical control signal representative of only the vehicle running condition;
    a solenoid operated pressure control valve;
    circuit means responsive to the second electrical control signal from said controller for providing controlled communication between said pressure source and said pressure control valve;
    said pressure control valve being responsive to the first electrical control signal from said controller for producing a control pressure variable with variation of the master cylinder pressure and the vehicle running condition;
    a wheel cylinder;
    first passage means for supplying the master cylinder pressure from said master cylinder to said wheel cylinder;
    second passage means for supplying the control pressure from said pressure control valve to said wheel cylinder; and
    a first directional control valve operatively connected to said first passage means for normally preventing supply of the master cylinder pressure to said wheel cylinder and permitting said supply of the master cylinder pressure at the time of failure of said controller, said circuit means, and said pressure control valve.

8. A brake control system according to claim 7, further comprising a second directional control valve operatively connected to said second passage means for normally permitting supply of the control pressure to said wheel cylinder and preventing said supply of the control pressure at the time of failure of said controller and said pressure control valve.

9. A brake control system according to claim 8, wherein said circuit means comprises third passage means fluidly connecting between said pressure source and said pressure control valve, and
    a third directional control valve operatively connected to said third passage means and responsive to the second electrical control signal from said controller.

* * * * *